(12) United States Patent
Pfadler et al.

(10) Patent No.: US 12,113,860 B2
(45) Date of Patent: Oct. 8, 2024

(54) METHOD, COMPUTER PROGRAM AND APPARATUS FOR INVOKING A TELE-OPERATED DRIVING SESSION

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 325 days.

(21) Appl. No.: 17/521,039

(22) Filed: Nov. 8, 2021

(65) Prior Publication Data

US 2022/0159075 A1    May 19, 2022

(30) Foreign Application Priority Data

Nov. 16, 2020   (EP) .................................... 20207901

(51) Int. Cl.
*H04L 67/12*   (2022.01)
*B60W 60/00*   (2020.01)
(Continued)

(52) U.S. Cl.
CPC ........... *H04L 67/12* (2013.01); *G05D 1/0276* (2013.01); *G06N 5/02* (2013.01); *B60W 60/005* (2020.02); *H04L 65/75* (2022.05)

(58) Field of Classification Search
CPC ....... H04L 67/12; H04L 65/75; G05D 1/0276; G06N 5/02; B60W 60/005
See application file for complete search history.

(56) References Cited

U.S. PATENT DOCUMENTS 8,538,600 B2    9/2013  Schoettl
9,767,369 B2 *  9/2017  Furman ................. G06V 20/58
(Continued)

FOREIGN PATENT DOCUMENTS

CN      110858960 A      3/2020
DE   102017212343 A1     1/2019
(Continued)

OTHER PUBLICATIONS

Search Report for European Patent Application No. 20207901.8; Apr. 23, 2021.

(Continued)

*Primary Examiner* — Dale W Hilgendorf
*Assistant Examiner* — Hana Lee
(74) *Attorney, Agent, or Firm* — Barnes & Thornburg LLP (57) ABSTRACT

A method, a computer program, and an apparatus for invoking a tele-operated driving session for a transportation vehicle equipped with an automated driving function, and a transportation vehicle equipped with an automated driving function, which uses the method or apparatus. A quality of service for a communication between the transportation vehicle and a control center is predicted for a tele-operated driving session, communication requirements for the tele-operated driving session are predicted, at least one parameter of the transportation vehicle is then adapted so that the communication requirements match the predicted quality of service, and a tele-operated driving session is initiated.

17 Claims, 5 Drawing Sheets

(51) Int. Cl.
*G05D 1/00* (2024.01)
*G06N 5/02* (2023.01)
*H04L 65/75* (2022.01)

(56) References Cited

U.S. PATENT DOCUMENTS

| | | | |
|---|---|---|---|
| 11,618,439 B2* | 4/2023 | Magzimof | G08G 1/164 |
| | | | 701/2 |
| 2016/0139594 A1 | 5/2016 | Okumura et al. | |
| 2019/0011912 A1* | 1/2019 | Lockwood | G05D 1/0027 |
| 2020/0057436 A1 | 2/2020 | Boda et al. | |
| 2020/0064864 A1 | 2/2020 | Franchi et al. | |
| 2020/0260334 A1 | 8/2020 | Gangakhedkar et al. | |
| 2021/0116907 A1* | 4/2021 | Altman | G05D 1/0022 |
| 2021/0231447 A1* | 7/2021 | Ahmed | G01C 21/3446 |
| 2021/0306887 A1* | 9/2021 | Kim | H04W 24/08 |
| 2022/0028090 A1* | 1/2022 | Yli-Opas | H04W 36/08 |
| 2022/0075366 A1* | 3/2022 | Blank | B60W 60/001 |

FOREIGN PATENT DOCUMENTS

| | | |
|---|---|---|
| DE | 112016007429 T5 | 8/2019 |
| EP | 2302481 A2 | 3/2011 |
| WO | 2009136969 A2 | 11/2009 |
| WO | 2019180700 A1 | 9/2019 |
| WO | 2020200602 A1 | 10/2020 |

OTHER PUBLICATIONS

Chinese Office Action, Chinese Patent Application No. 202111354343.4; May 31, 2024.

* cited by examiner

METHOD, COMPUTER PROGRAM AND APPARATUS FOR INVOKING A TELE-OPERATED DRIVING SESSION

PRIORITY CLAIM

This patent application claims priority to European Patent Application No. 20207901.8, filed 16 Nov. 2020, the disclosure of which is incorporated herein by reference in its entirety.

SUMMARY

Illustrative embodiments relate to a method, a computer program, and an apparatus for invoking a tele-operated driving session for a transportation vehicle equipped with an automated driving function. Illustrative embodiments further relate to a transportation vehicle equipped with an automated driving function, which makes use of such a method or apparatus.

BRIEF DESCRIPTION OF THE DRAWINGS

Disclosed embodiments will be described in greater detail below with reference to the figures, in which.

DETAILED DESCRIPTION

Tele-operated driving is gathering more and more interest. Tele-operated driving in the present context means that an external operator controls a transportation vehicle remotely. The external operator is located in a control center. There may be a large distance between the control center and the transportation vehicle. The control center and the transportation vehicle are connected via a radio communication system and its backhaul. Primarily, the radio communication system is part of a public mobile communication system such as LTE (Long Term Evolution) or 5G.

Tele-operated driving belongs to safety-related time-critical applications. Main requirements for the exchange of information are low latency, high data rate, and high reliability.

Autonomous driving, also referred to as automatic driving, automated driving, or piloted driving, is the movement of transportation s, mobile robots and driverless transport systems that are largely autonomous. There are different degrees of autonomous driving. In Europe, various transport ministries, for example, the Federal Institute for Road Systems (Bundesanstalt fur StraBenwesen) in Germany, have defined the following autonomous stages:

Level 0: "Driver only", the driver drives himself, steers, accelerates, brakes, etc.

Level 1: Certain assistance systems help with transportation vehicle operation, including a cruise control system such as ACC (Automatic Cruise Control).

Level 2: Partial automation. Therein, automatic parking, tracking function, general longitudinal guidance, acceleration, deceleration, etc. are taken over by the assistance systems, including collision avoidance.

Level 3: High automation. The driver does not have to monitor the system continuously. The transportation vehicle independently performs functions such as the triggering of the turn signal, lane change and tracking. The driver can turn to other things, but if requested, the driver has to take over control within a pre-warning period.

Level 4: Full automation. The guidance of the transportation vehicle is permanently performed by the system. If the system is no longer able to handle the tasks, the driver can be asked to take over control.

Level 5: No driver required. Apart from setting the target and starting the system, no human intervention is required.

A slightly different definition of levels is known from the Society of Automotive Engineers (SAE). In this regard, reference is made to the SAE J3016 standard. Such definitions could also be used instead of the above given definition.

Tele-operated driving might become a key technology to solve issues with Level 4 and Level 5 driven transportation vehicles. A transportation vehicle driving autonomously makes its decisions based on the perception of its environment as well as on predefined traffic regulations. However, it may happen that an autonomous vehicle is no longer able to continue its planned route, e.g., due to an incorrect interpretation of the environment, sensor failures, poor road conditions, or unclear traffic conditions, e.g., an accident or a construction site. In such situations, the transportation vehicle needs external instructions from someone else to solve the situation, e.g., the external operator located in the control center. The transportation vehicle will be driven remotely by the external operator during a tele-operated driving session until the transportation vehicle can resume its autonomous driving operation.

To operate this remote control, data is exchanged through a cellular network. The quality of the uplink connection for the transmission of perception data and the downlink connection for the transmission of control data, also named quality of service (QoS), has a dramatic impact on the quality of application (QoA). The most important key performance indicators for tele-operations are latency and data rate of the communication network, e.g., a 4G network.

In this regard, DE 11 2016 007 429 T5 discloses a remote operation system for a transportation vehicle. The remote operation system includes a plurality of remote operation devices, each of which includes a communication unit configured to communicate with the transportation vehicle and receive information including a remote operation request, a presentation unit configured to present a situation of the transportation vehicle received from the transportation vehicle by the communication unit to a remote operator, a reception unit configured to receive an operation of the remote operator, and a control unit configured to generate control information on the basis of the operation received by the reception unit and transmit the control information to the transportation vehicle using the communication unit. A remote operation device having a good communication environment with respect to the transportation vehicle transmitting the remote operation request among the plurality of remote operation devices executes the remote operation.

US 2016/0139594 A1 discloses a method for remotely operating an autonomous vehicle. When the transportation vehicle encounters an unexpected driving environment unsuitable for autonomous operation, transportation vehicle sensors capture data about the transportation vehicle and the unexpected driving environment, including images, radar and lidar data, etc. The captured data are sent to a remote operator, who manually operates the transportation vehicle remotely or issues commands to the autonomous vehicle to be executed by various transportation vehicle systems. The captured data sent to the remote operator can be optimized to conserve bandwidth, such as by sending a limited subset of the captured data.

It is foreseen that the predictive quality of service (PQoS) will be provided by the network or by the transportation vehicle itself. This value of the predictive quality of service is given for a certain time horizon. For a reliable tele-operated driving session, it has to be ensured that communication requirements match the predictive quality of service. For example, the predictive quality of service may be given as the maximum data rate for the next t seconds. The required data rate then needs to be below the predicted future maximum data rate.

WO 2019/180700 A1 discloses a method of autonomous driving tele-operated vehicles. A vehicular Artificial Intelligence unit is configured to receive inputs from a plurality of vehicular sensors of a transportation vehicle, to locally process within the transportation vehicle at least a first portion of the inputs, to wirelessly transmit via a vehicular wireless transmitter at least a second portion of the inputs to a remote tele-driving processor located externally to the transportation vehicle, to wireles sly receive via a vehicular wireless receiver from the remote tele-driving processor, a remotely-computed processing result that is received from a remote Artificial Intelligence unit, and to implement a vehicular operating command based on the remotely-computed processing result, via an autonomous driving unit of the transportation vehicle or via a tele-driving unit of the transportation vehicle.

US 2020/0260334 A1 discloses a network operator, a tele-operation application and an application for a tele-operable vehicle. The network operator is capable of creating a network slice for tele-operating a tele-operable vehicle along at least one route, receiving, from the tele-operation application, a slice configuration request comprising a quality of service for the at least one route, and configuring the network slice to support the quality of service for the at least one route.

WO 2020/200602 A1 discloses a method for tele-operated driving of a transportation vehicle. A prediction is made with regard to a future quality of service of a mobile radio connection of the transportation vehicle to a vehicle control center. Knowledge is obtained with regard to an environment of the transportation vehicle and adjustments relating to tele-operated driving are made on the basis of the knowledge and the prediction.

Disclosed embodiments provide improved solutions for invoking a tele-operated driving session for a transportation vehicle.

This is achieved by a method, by a computer program that implements this method, and by an apparatus.

According to a first disclosed embodiment, a method for invoking a tele-operated driving session for a transportation vehicle equipped with an automated driving function comprises:
predicting a quality of service for a communication between the transportation vehicle and a control center for a tele-operated driving session;
predicting communication requirements for the tele-operated driving session; and
adapting at least a maximum vehicle speed of the transportation vehicle such that the communication requirements match the predicted quality of service.

Accordingly, a computer program comprises instructions, which, when executed by at least one processor, cause the at least one processor to perform the following operations for invoking a tele-operated driving session for a transportation vehicle equipped with an automated driving function:
predicting a quality of service for a communication between the transportation vehicle and a control center for a tele-operated driving session;
predicting communication requirements for the tele-operated driving session; and
adapting at least a maximum vehicle speed of the transportation vehicle such that the communication requirements match the predicted quality of service.

The term computer has to be understood broadly. In particular, it also includes electronic control units, embedded devices and other processor-based data processing devices.

The computer program code can, for example, be made available for electronic retrieval or stored on a computer-readable storage medium.

According to another disclosed embodiment, an apparatus for invoking a tele-operated driving session for a transportation vehicle equipped with an automated driving function comprises:
a first predicting module configured to predict a quality of service for a communication between the transportation vehicle and a control center for a tele-operated driving session;
a second predicting module configured to predict communication requirements for the tele-operated driving session; and
a control module configured to adapt at least a maximum vehicle speed of the transportation vehicle such that the communication requirements match the predicted quality of service.

The characteristics of the uplink stream are time-variable and may change. The communication requirements are, amongst others, a function of vehicular parameters, i.e., different settings of the transportation vehicle lead to a distinct data output that has to be sent through the dynamic radio channel. Therefore, it is possible to adapt the vehicular parameters to the predicted quality of service. According to the disclosure, a predicting module predicts the future communication requirements of the application to perform this adaptation. In particular, it has been observed that the data rate in the uplink stream increases when the speed of the transportation vehicle increases. As such, by limiting the speed for given surrounding conditions, the required data rate can be kept below the maximum available data rate.

In an exemplary embodiment, the communication requirements for the tele-operated driving session include at least one of data rate and latency. The expected date rate and latency are the most relevant requirements for a reliable tele-operated driving session. It is thus beneficial to focus prediction of the communication requirements on those parameters.

In an exemplary embodiment, a further parameter of the transportation vehicle that is adapted is a video compression setting. During a tele-operated driving session, video data need to be transmitted to the control center. Amongst others, the video compression settings determine the amount of transmitted data. Therefore, in addition to adapting the maximum vehicle speed, it is likewise possible to adapt the video compression settings.

In an exemplary embodiment, the communication requirements for the tele-operated driving session are predicted from data obtained by sensors of the transportation vehicle. Apart from the transportation vehicle speed, the surrounding conditions determine the required data rate, in particular, the number of objects in the surrounding of the transportation vehicle and a dynamic of the environment. The more objects are present and the more dynamic the environment is, the more data need to be transmitted. Both the number of objects and the dynamic of the environment can reliably be detected using sensors of the transportation vehicle, e.g., RADAR sensors, LIDAR sensors, cameras for 2D and 3D image acquisition, or ultrasonic sensors.

In an exemplary embodiment, a predictive behavior of objects in the surrounding of the transportation vehicle is taken into account when predicting the communication requirements for the tele-operated driving session. By predicting the behavior of objects in the surrounding of the transportation vehicle, future states of this transportation vehicle surrounding can be predicted. These future states are useful for a more accurate prediction of the communication requirements.

In an exemplary embodiment, the communication requirements for the tele-operated driving session are predicted using a function obtained by artificial intelligence. For example, using algorithms that implement approaches towards artificial intelligence, e.g., supervised learning approaches based on linear models, support vector machines, or neural network model, to name a few, a function that connects the predicted required data rate with the transportation vehicle speed and the number of objects can be determined.

In an exemplary embodiment, the quality of service is predicted using previously determined data on a quality of service, data from sidelink communication from other transportation vehicles, or environment data for the location where the tele-operated driving session should be performed. The previously determined data on a quality of service may be obtained, for example, from previous measurements of the transportation vehicle or from data provided by a service provider. For example, the automated vehicle may already have gathered information on the quality of service of a communication link for a particular location during previous trips, or it may receive such information from other transportation vehicles. Alternatively, a service provider may provide map data including such information. When the quality of service is predicted using environment data, these data may comprise information on buildings or locations of communication infrastructures. Based on such data, it can be analyzed whether for a particular location interferences caused by buildings are to be expected.

An autonomous or semi-autonomous vehicle comprises an exemplary apparatus or is configured to perform an exemplary method for invoking a tele-operated driving session. In this way, the transportation vehicle shows an improved behavior when a tele-operated driving session needs to be invoked. The transportation vehicle may be any type of vehicle, e.g., a car, a bus, a motorcycle, a commercial vehicle, in particular, a truck, an agricultural machinery, a construction machinery, a rail vehicle, etc. More generally, the disclosed embodiments can be used in land vehicles, rail vehicles, watercrafts, and aircrafts. This expressively includes robots and drones.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a method or mechanism for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited methods or mechanisms are combined and brought together in the way which the claims call for. It is thus regarded that any method or mechanism that can provide those functionalities are equivalent to those shown herein.

Figure 1:
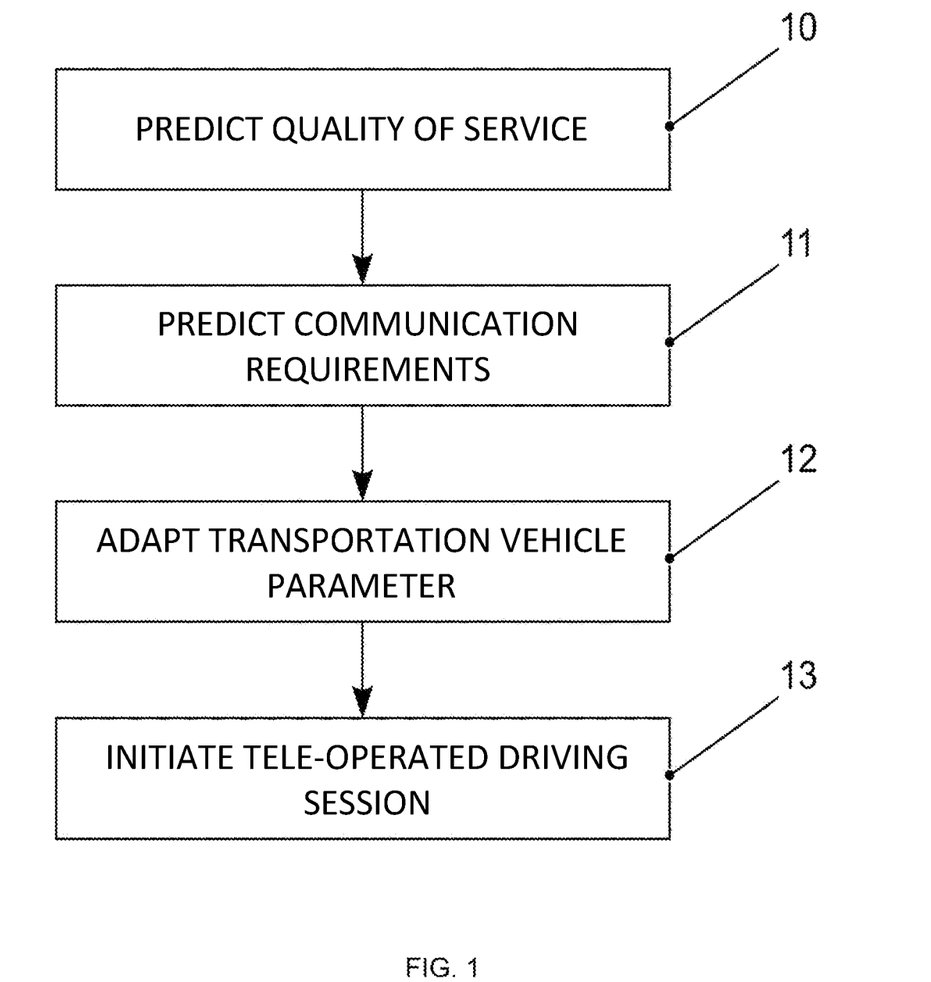
FIG. 1 schematically illustrates a method for invoking a tele-operated driving session for a transportation vehicle equipped with an automated driving function.

FIG. 1 schematically illustrates a disclosed method for invoking a tele-operated driving session for a transportation vehicle equipped with an automated driving function. In a first operation, a quality of service for a communication between the transportation vehicle and a control center is predicted 10 for a tele-operated driving session. The quality of service may be predicted 10 using previously determined data on a quality of service, data from sidelink communication from other transportation vehicles, or environment data for the location of the tele-operated driving session. The previously determined data on a quality of service may be obtained, for example, from previous measurements of the transportation vehicle or from data provided by a service provider. The environment data may comprise information on buildings or locations of communication infrastructures. Furthermore, communication requirements for the tele-operated driving session are predicted 11, e.g., data rate and latency. For example, a function obtained by artificial intelligence may be used for this purpose. Optionally, the communication requirements are predicted from data obtained by sensors of the transportation vehicle. For example, the data may include a number of objects in the surrounding of the transportation vehicle and a dynamic of the environment. Optionally, a predictive behavior of objects in the surrounding of the transportation vehicle is taken into account when predicting the communication requirements. At least a maximum vehicle speed of the transportation vehicle is then adapted 12 such that the communication requirements match the predicted quality of service. In addition, a video compression setting may be adapted 12. Finally, a tele-operated driving session is initiated 13.

Figure 2:
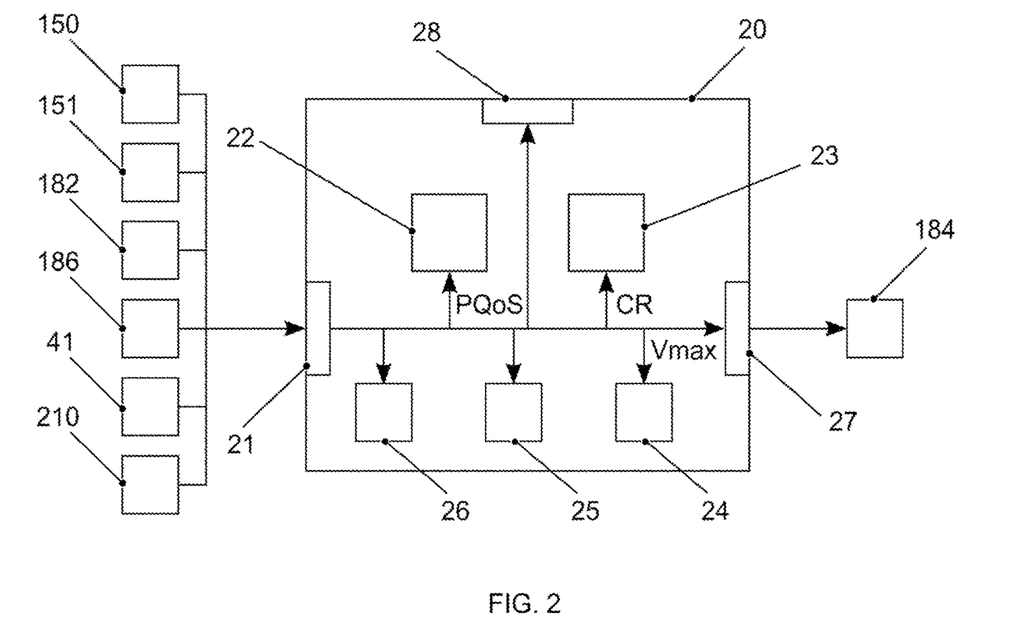
FIG. 2 schematically illustrates a first exemplary embodiment of an apparatus for invoking a tele-operated driving session for a transportation vehicle equipped with an automated driving function.

FIG. 2 schematically illustrates a block diagram of a first disclosed embodiment of an exemplary apparatus 20 for invoking a tele-operated driving session for a transportation vehicle equipped with an automated driving function. The apparatus 20 has an input 21 for receiving data, e.g., from sensors 150, 151, 182, 186 of the transportation vehicle, from other transportation vehicles 41 or from a base station 210. A first predicting module 22 is configured to predict a quality of service for a communication between the transportation vehicle and a control center for a tele-operated driving session. For example, the first predicting module 22 may be configured to predict the quality of service PQoS using previously determined data on a quality of service, data from sidelink communication from other transportation vehicles, or environment data for the location where the tele-operated driving session should be performed. The previously determined data on a quality of service may be obtained, for example, from previous measurements of the transportation vehicle or from data provided by a service provider. The environment data may comprise information on buildings or locations of communication infrastructures. A second predicting module 23 predicts communication requirements CR for the tele-operated driving session e.g., data rate and latency. For example, the second predicting module 23 may use a function obtained by artificial intelligence for this purpose. Optionally, the communication requirements CR are predicted from data obtained by sensors of the transportation vehicle. For example, the data may include a number of objects in the surrounding of the transportation vehicle and a dynamic of the environment. Optionally, a predictive behavior of objects in the surrounding of the transportation vehicle is taken into account by the second predicting module 23 when predicting the communication requirements CR. A control module 24 then adapts at least a maximum vehicle speed Vmax of the transportation vehicle such that the communication requirements match the predicted quality of service. In addition, the control module 24 may adapt a video compression setting. Control signals generated by the control module 24 or the predicting modules 22, 23 may be provided for further use to an automatic driving control unit 184 via an output 27. A local storage unit 26 is provided, e.g., for storing data during processing. The output 27 may also be combined with the input 21 into a single bidirectional interface.

The predicting modules 22, 23 and the control module 24 may be controlled by a controller 25. A user interface 28 may be provided for enabling a user to modify settings of the predicting modules 22, 23, the control module 24, or the controller 25. The predicting modules 22, 23, the control module 24, and the controller 25 can be embodied as dedicated hardware units. Of course, they may likewise be fully or partially combined into a single unit or implemented as software running on a processor, e.g., a CPU or a GPU.

Figure 3:
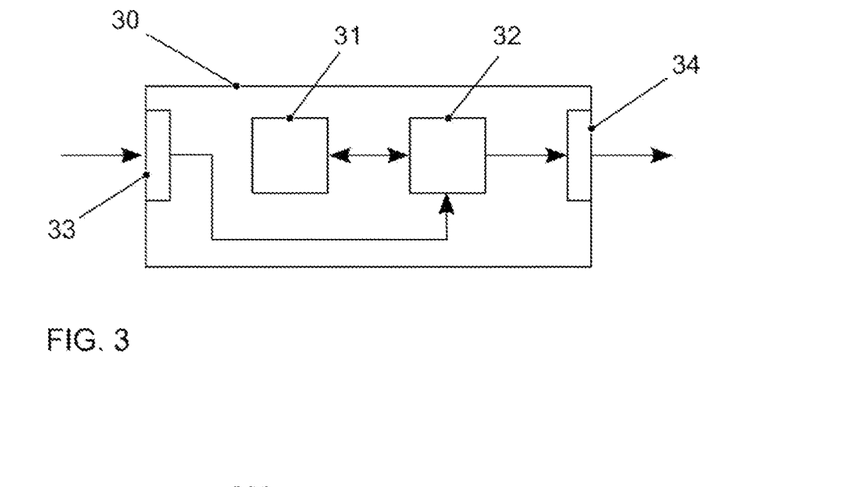
FIG. 3 schematically illustrates a second exemplary embodiment of an apparatus for invoking a tele-operated driving session for a transportation vehicle equipped with an automated driving function.

A block diagram of a second disclosed embodiment of an exemplary apparatus 30 for invoking a tele-operated driving session for a transportation vehicle equipped with an automated driving function is illustrated in FIG. 3. The apparatus 30 comprises a processing device 31 and a memory device 32. For example, the apparatus 30 may be a computer, an electronic control unit or an embedded system. The memory device 32 has stored instructions that, when executed by the processing device 31, cause the apparatus 30 to perform operations according to one of the described methods. The instructions stored in the memory device 32 thus tangibly embody a program of instructions executable by the processing device 31 to perform program operations as described herein according to the present principles. The apparatus 30 has an input 33 for receiving data. Data generated by the processing device 31 are made available via an output 34. In addition, such data may be stored in the memory device 32. The input 33 and the output 34 may be combined into a single bidirectional interface.

The processing device 31 as used herein may include one or more processing units, such as microprocessors, digital signal processors, or a combination thereof.

The local storage unit 26 and the memory device 32 may include volatile and/or non-volatile memory regions and storage devices such as hard disk drives, optical drives, and/or solid-state memories.

In the following, an exemplary embodiment shall be explained in more detail with reference to FIG. 4 to FIG. 6.

Figure 4:
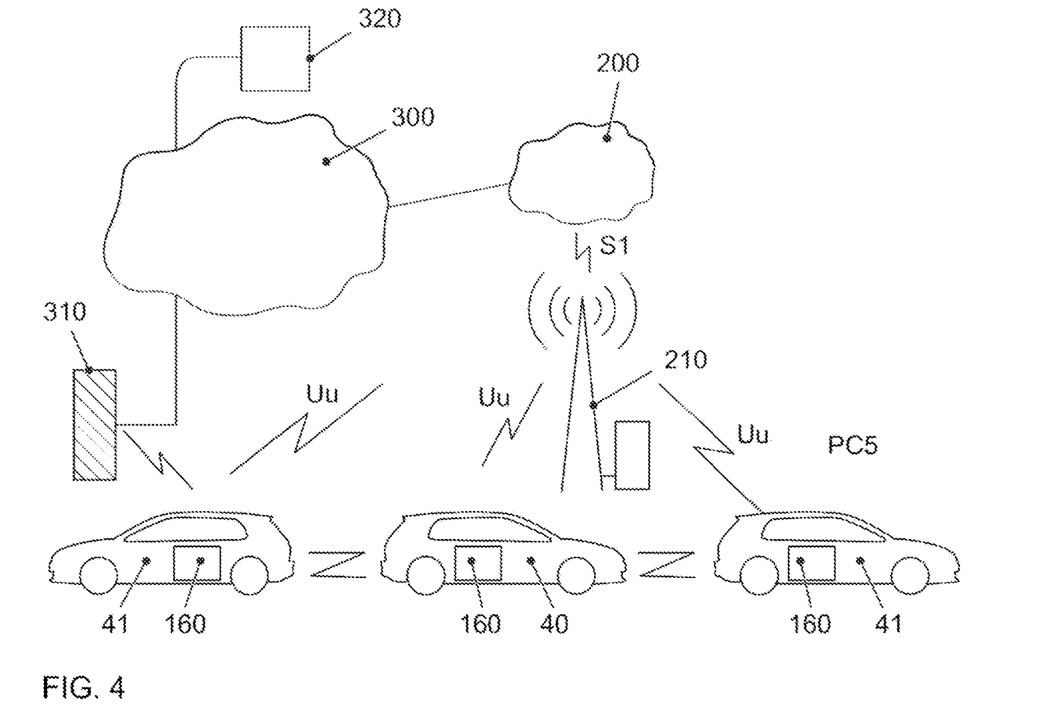
FIG. 4 illustrates a basic architecture of a V2V and V2X communication system.

FIG. 4 illustrates a basic architecture of a V2V (Vehicle-to-Vehicle) and V2X (Vehicle-to-Everything) communication system. Reference numeral 40 denotes a transportation vehicle, which in this example is a car, in particular, a passenger car. The transportation vehicle 40 is equipped with an on-board connectivity module 160 including a corresponding antenna such that the transportation vehicle 40 can participate in any form of mobile communication service. As shown in FIG. 4, the transportation vehicle 40 may transmit and receive signals to and from a base station 210 of a mobile communication service provider using a V2N (Vehicle-to-Network) communication link Uu.

Such base station 210 may be an eNodeB (Evolved Node B) base station of an LTE mobile communication service provider or a gNB (Next Generation Node B) base station of a 5G mobile communication provider. The base station 210 and the corresponding equipment are part of a mobile communication network with a plurality of network cells, where each cell is served by one base station 210.

The base station 210 in FIG. 4 is positioned close to a main road, on which the transportation vehicle 40 is driving. Of course, other transportation vehicles 41 may also drive on the road. In the terminology of LTE, a mobile terminal corresponds to a user equipment, which allows a user to access network services, connecting to the UTRAN (UMTS (Universal Mobile Telecommunications System) Terrestrial Radio Access Network) or Evolved-UTRAN via the radio interface. Typically, such user equipment corresponds to a smart phone. Of course, mobile terminals are also used in the transportation vehicles 40, 41 as on-board connectivity modules 160. These on-board connectivity modules 160 are LTE, 5G, or any other communication modules, which enable the transportation vehicles 40, 41 to receive mobile data in downstream direction and to send such data in upstream or in direct device-to-device direction.

In terms of an LTE mobile communication system, the Evolved-UTRAN consists of a plurality of eNodeBs, providing the E-UTRA user plane protocol terminations, i.e., PDCP (Packet Data Convergence Protocol), RLC (Radio Link Control), MAC, (Medium Access Control), and PHY (Physical Layer), and the control plane protocol termination, i.e., RRC (Radio Resource Control) towards the user equipment. The eNodeBs are interconnected by the so-called X2 interface. The eNodeBs are also connected by the so-called S1 interface to an EPC (Evolved Packet Core) 200, more specifically to an MME (Mobility Management Entity) by an S1-MME interface and to a serving gateway by an S1-U interface.

In relation to this general architecture, FIG. 4 shows that the eNodeB is connected to the EPC 200 via the S1 interface and that EPC 200 is connected to the Internet 300. The control center computer 320, to which the transportation vehicles 40, 41 send messages and from which the transportation vehicles 40, 41 receive messages, is also connected to the Internet 300. In the field of cooperative and automated driving, the control center computer 320 typically is located in a traffic control center, where the operators for the tele-operated driving sessions requested by the transportation vehicles 40, 41 are working. Finally, also an infrastructure network component is shown, in this case a roadside unit 310. For the ease of implementation, it is considered that all components have assigned an Internet address, typically as an IPv6 address, such that the packets transporting messages between the components can be routed accordingly.

The various interfaces of the LTE network architecture are standardized. In this regard, reference is made to the various LTE specifications, which are publicly available for the sake of sufficiently disclosing further implementation details.

The transportation vehicles 40, 41 may also be equipped with methods or mechanisms for observing their surroundings. Their sensor systems, which are used to capture the environmental objects, are based on different measuring methods, depending on the application. Widespread technologies are, among others, RADAR, LIDAR, cameras for 2D and 3D image acquisition, and ultrasonic sensors.

Since automated driving is on the rise, a lot more data needs to be exchanged among the transportation vehicles 40, 41, e.g., using V2V communication links PC5, and also between the transportation vehicles 40, 41 and the network. The communication systems for V2V and V2X communication need to be adapted correspondingly. The 3GPP standard setting organization has been and is releasing features for the new generation of the 5G cellular mobile communication system, including V2X features. A large panel of vehicular use cases have been designed, ranging from infotainment to cooperative driving. Depending on the application, the requirement on the access link Uu in the scope of V2N communication drastically changes. When it comes to safety-related time-critical applications such as tele-operated driving, in which a command center takes over certain driving functions of the transportation vehicle, these requirements are the exchange of information with low latency, high data rate and high reliability.

Figure 5:
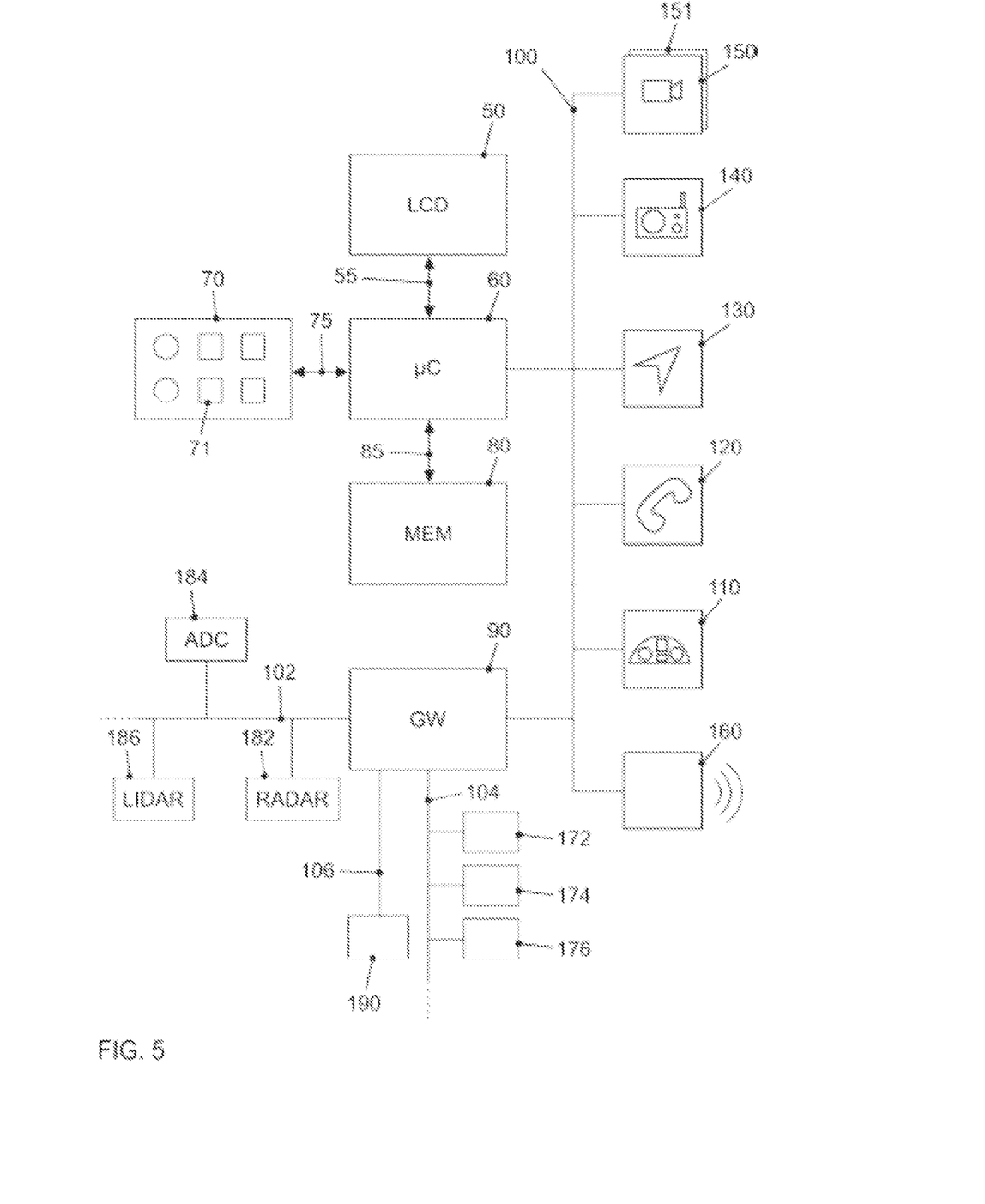
FIG. 5 shows a block diagram of an electronics system of a transportation vehicle.

FIG. 5 schematically shows a block diagram of a board electronics system of a transportation vehicle. Part of the board electronics system is an infotainment system, which comprises a touch-sensitive display unit 50, a computing device 60, an input unit 70, and a memory device 80. The display unit 50 is connected to the computing device 60 via a data line 55 and includes both a display area for displaying variable graphical information and an operator interface (touch-sensitive layer) arranged above the display area for inputting commands by a user. The input unit 70 is connected to the computing device 60 via a data line 75. Reference numeral 71 designates a press button that allows a driver to manually request a tele-operated driving session if the transportation vehicle is blocked and the driver wants the support of a tele-operated driving operator to find a way out of the blocking situation. There is no need for a dedicated press button 71 if other techniques for manual control are used. This includes selecting an option in a user menu displayed on the display unit 50, detecting the command with speech recognition, or using gesture control method or mechanism.

The memory device 80 is connected to the computing device 60 via a data line 85. In the memory device 80, a pictogram directory and/or symbol directory is deposited with pictograms and/or symbols for possible overlays of additional information.

The other parts of the infotainment system, such as a camera 150, radio 140, navigation device 130, telephone 120 and instrument cluster 110 are connected via a data bus 100 with the computing device 60. As data bus 100, the high-speed option of the CAN (Controller Area Network) bus according to ISO standard 11898-2 may be used. Alternatively, an Ethernet-based bus system such as IEEE 802.03cg can be used. Bus systems implementing the data transmission via optical fibers are also usable. Examples are the MOST Bus (Media Oriented System Transport) or the D2B Bus (Domestic Digital Bus). For inbound and outbound wireless communication, the transportation vehicle is equipped with an on-board connectivity module 160. It can be used for mobile communication, e.g., mobile communication according to the 5G standard.

Reference numeral 172 denotes an engine control unit. Reference numeral 174 denotes an ESC (electronic stability control) unit, whereas reference numeral 176 denotes a transmission control unit. The networking of such control units, all of which are allocated to the category of the drive train, typically occurs with a CAN bus 104. Since various sensors are installed in the motor transportation vehicle and these are no longer only connected to individual control units, such sensor data are also distributed via the bus system 104 to the individual control devices.

Modern transportation vehicles may comprise additional components, such as further sensors for scanning the surroundings, like a LIDAR sensor 186 or a RADAR sensor 182 and additional video cameras 151, e.g., a front camera, a rear camera or side cameras. Such sensors are increasingly used in transportation vehicles for observation of the environment. Further control devices, such as an ADC (automatic driving control) unit 184, etc., may be provided in the transportation vehicle. The RADAR and LIDAR sensors 182, 186 may have a scanning range of up to 250 m, whereas the cameras 150, 151 may cover a range from 30 m to 120 m. The components 182 to 186 are connected to another communication bus 102, e.g., an Ethernet-Bus due to its higher bandwidth for data transport. One Ethernet-bus adapted to the special needs of car communication is standardized in the IEEE 802.1Q specification. Moreover, a lot of information about the environment may be received via V2V communication from other transportation vehicles. Particularly for those transportation vehicles that are not in line of sight to the observing transportation vehicle, it is very beneficial to receive the information about their position and motion via V2V communication.

Reference numeral 190 denotes an on-board diagnosis interface, which is connected to another communication bus 106.

For the purpose of transmitting the vehicle-relevant sensor data via the an on-board connectivity module 160 to another transportation vehicle or to a control center computer, a gateway 90 is provided. This gateway 90 is connected to the different bus systems 100, 102, 104 and 106. The gateway 90 is adapted to convert the data it receives via one bus to the transmission format of another bus so that it can be distributed using the packets specified for the respective other bus. For forwarding this data to the outside, i.e., to another transportation vehicle or to the control central computer, the an on-board connectivity module 160 is equipped with a communication interface to receive these data packets and, in turn, to convert them into the transmission format of the appropriate mobile radio standard.

Figure 6:
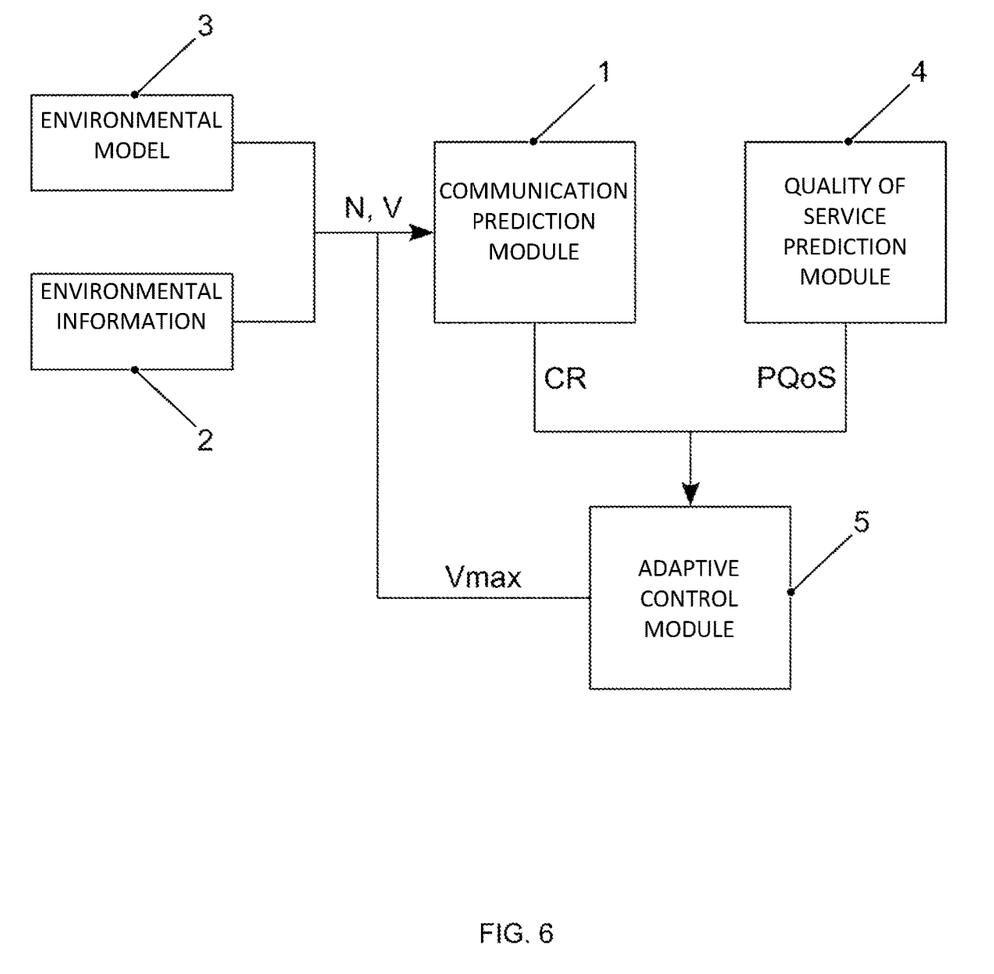
FIG. 6 shows a system overview of the tele-operated driving modules as used in the present disclosure.

FIG. 6 shows a system overview of the tele-operated driving modules as used in the present disclosure. A communication prediction module 1 outputs a prediction of the communication requirements CR, e.g., the required data rate and/or latency for a tele-operated driving session. For this purpose, the communication prediction module 1 takes the vehicle speed V and the number N of objects as input. The number N of objects is determined using environmental information 2 and an environmental model 3 of the transportation vehicle. The communication prediction module 1 may further consider the dynamic of the environment and the predictive behavior of the objects. A quality of service prediction module 4 predicts a quality of service PQoS for the tele-operated driving session. Based on the communication requirements CR and the predicted quality of service PQoS, an adaptive control module 5 determines the necessary adaptations of the transportation vehicle parameters for the tele-operated driving session, e.g., the maximum vehicle speed Vmax or video compression settings.

In other words, current data from the surrounding of the transportation vehicle is gathered and the future states of this transportation vehicle surrounding are predicted. Furthermore, a current speed V of the transportation vehicle is obtained. The communication prediction module 1 then derives a relationship that delivers predicted communication requirements CR, e.g., a predicted data rate, as a function of the speed and the environmental information. A learning operations supported by an artificial intelligence may be added to improve this function. Then, by inverting the function at the core of the communication prediction module 1, it is possible to obtain a speed as a function of the data rate for given environmental information, e.g., for a given number N of objects. The adaptive control module 5 makes use of this function to adapt the application, e.g., to reduce the speed V, such that the predicted communication requirements CR match the predicted quality of service PQoS. The new speed V may be used in a feedback loop to update the environmental model 3 of the transportation vehicle. The whole process may be repeated until the tele-operated driving session ends.

REFERENCE NUMERALS

1 Communication prediction module 1
2 Environmental information
3 Environmental model
4 Quality of service prediction module
5 Adaptive control module
10 Predict quality of service
11 Predict communication requirements
12 Adapt transportation vehicle parameter
13 Initiate tele-operated driving session
20 Apparatus
21 Input
22 First predicting module
23 Second predicting module
24 Control module
25 Controller
26 Local storage unit
27 Output
28 User interface
30 Apparatus
31 Processing device
32 Memory device
33 Input
34 Output
40 Transportation vehicle
41 Other transportation vehicle
50 Display Unit
55 Data line to display unit
60 Computing device
70 Input unit
71 Press button
75 Data line to input unit
80 Memory unit
85 Data line to memory unit
90 Gateway
100 First data bus
102 Second data bus
104 Third data bus
106 Fourth data bus
110 Instrument cluster
120 Telephone
130 Navigation device
140 Radio
150 Camera
151 Further cameras
160 On-board connectivity module
172 Engine control unit
174 Electronic stability control unit
176 Transmission control unit
182 RADAR sensor
184 Automatic driving control unit
186 LIDAR sensor
190 On-board diagnosis interface
200 Evolved packet core
210 Base station
300 Internet
310 Roadside unit
320 Control center computer
CR Communication requirements
N Number of objects
PC5 V2V communication link
PQoS Predicted quality of service S1 interface
Uu V2N communication link
V Vehicle speed
Vmax Maximum vehicle speed

The invention claimed is:

1. An apparatus for invoking a tele-operated driving session for a transportation vehicle equipped with an automated driving function, the apparatus comprising:
a first predicting module configured to predict a quality of service required for communication between the transportation vehicle and a control center for a tele-operated driving session; and
a second predicting module configured to predict communication requirements for the tele-operated driving session to be performed at the predicted, quality of service required, wherein the predicted communication requirements for the tele-operated driving session are determined based on both vehicle speed and a predictive behavior of a plurality of objects determined to be in surroundings of the transportation vehicle by vehicle sensors; and
a control module configured to adapt at least a maximum vehicle speed of the transportation vehicle so that the predicted communication requirements for the tele-operated driving session match the predicted quality of service required to provide tele-operated driving functionality while taking into account the predictive behavior of the plurality of objects determined to be in the surroundings of the transportation vehicle.

2. A transportation vehicle equipped with the automated driving function, wherein the transportation vehicle comprises the apparatus of claim 1 for invoking the tele-operated driving session.

3. The apparatus of claim 1, wherein the communication requirements for the tele-operated driving session include at least one of data rate and latency.

4. The apparatus of claim 1, wherein the predictive behavior of the plurality of objects are predicted from data obtained by sensors of the transportation vehicle.

5. The apparatus of claim 4, wherein the data obtained by sensors of the transportation vehicle include at least one of a number of the plurality of objects in the surroundings of the transportation vehicle and a dynamic of the environment in the surroundings.

6. The apparatus of claim 1, wherein the communication requirements for the tele-operated driving session are predicted using a function obtained by artificial intelligence.

7. The apparatus of claim 1, wherein the required quality of service is predicted using previously determined data on the quality of service, data from sidelink communication from other transportation vehicles, or environment data for a location of the tele-operated driving session.

8. The apparatus of claim 7, wherein the previously determined data on the quality of service are obtained from previous measurements of the transportation vehicle or from data provided by a service provider.

9. A method for invoking a tele-operated driving session for a transportation vehicle equipped with an automated driving function, the method comprising:
predicting a required quality of service for communication between the transportation vehicle and a control center for the tele-operated driving session; and
predicting communication requirements for the tele-operated driving session to be performed at the predicted, quality of service required, wherein the predicted communication requirements for the tele-operated driving session are determined based on both vehicle speed and a predictive behavior of a plurality of objects determined to be in surroundings of the transportation vehicle by vehicle sensors; and
adapting at least a maximum vehicle speed of the transportation vehicle so that the predicted communication requirements for the tele-operated driving session match the predicted quality of service required to provide tele-operated driving functionality while taking into account the predictive behavior of the plurality of objects determined to be in the surroundings of the transportation vehicle.

10. A non-transitory computer readable medium that includes a computer program comprising instructions, which, when executed by a computer, cause the computer to perform the method of claim 9 for invoking the tele-operated driving session for the transportation vehicle equipped with the automated driving function.

11. The method of claim 9, wherein the communication requirements for the tele-operated driving session include at least one of data rate and latency.

12. The method of claim 9, further comprising adapting a video compression setting.

13. The method of claim 9, wherein the predictive behavior of the plurality of objects is predicted from data obtained by sensors of the transportation vehicle.

14. The method of claim 13, wherein the data obtained by sensors of the transportation vehicle include at least one of a number of the plurality of objects in the surroundings of the transportation vehicle and a dynamic of the environment in the surroundings.

15. The method of claim 9, wherein the communication requirements for the tele-operated driving session are predicted using a function obtained by artificial intelligence.

16. The method of claim 9, wherein the required quality of service is predicted using previously determined data on the quality of service, data from sidelink communication from other transportation vehicles, or environment data for a location of the tele-operated driving session.

17. The method of claim 9, wherein the previously determined data on the quality of service are obtained from previous measurements of the transportation vehicle or from data provided by a service provider.

* * * * *